United States Patent
Beadle et al.

(10) Patent No.: US 7,894,512 B2
(45) Date of Patent: Feb. 22, 2011

(54) SYSTEM AND METHOD FOR AUTOMATIC RECOVERY AND COVARIANCE ADJUSTMENT IN LINEAR FILTERS

(75) Inventors: Edward R. Beadle, Melbourne, FL (US); John F. Dishman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 875 days.

(21) Appl. No.: 11/830,881

(22) Filed: Jul. 31, 2007

(65) Prior Publication Data

US 2010/0027603 A1 Feb. 4, 2010

(51) Int. Cl.
*H04Q 1/20* (2006.01)
(52) U.S. Cl. ............ 375/226; 375/371; 375/224; 375/354; 375/373; 375/227; 375/225
(58) Field of Classification Search .......... 375/226, 375/371, 224, 354, 373, 227, 225
See application file for complete search history.

(56) References Cited

U.S. PATENT DOCUMENTS

| | | | | |
|---|---|---|---|---|
| 4,542,647 | A | 9/1985 | Molnar | 73/151 |
| 5,155,695 | A * | 10/1992 | Stein | 702/178 |
| 5,638,281 | A | 6/1997 | Wang | 364/461 |
| 6,295,326 | B1 | 9/2001 | Tonissen et al. | 375/350 |
| 6,417,802 | B1 * | 7/2002 | Diesel | 342/357.14 |
| 6,711,230 | B1 * | 3/2004 | Nicholls et al. | 375/376 |
| 7,317,361 | B2 * | 1/2008 | Duven et al. | 331/25 |
| 7,453,963 | B2 * | 11/2008 | Joublin et al. | 375/346 |
| 7,545,894 | B2 * | 6/2009 | Ziedan et al. | 375/347 |
| 2002/0009168 | A1 * | 1/2002 | Dick et al. | 375/356 |
| 2002/0027883 | A1 * | 3/2002 | Belaiche | 370/252 |
| 2003/0058927 | A1 * | 3/2003 | Douglas et al. | 375/147 |
| 2003/0105588 | A1 | 6/2003 | Lin et al. | 702/1 |
| 2005/0089128 | A1 * | 4/2005 | McReynolds | 375/354 |
| 2005/0090947 | A1 | 4/2005 | Wise | 701/6 |
| 2005/0251328 | A1 * | 11/2005 | Merwe et al. | 701/200 |

(Continued)

FOREIGN PATENT DOCUMENTS

EP 1838013 9/2007

(Continued)

OTHER PUBLICATIONS

H. W. Sorenson, "Kalman Filtering Techniques", Advances in Control Systems Theory & Applications, 1966, pp. 90-125, vol. 3, Academic Press Inc.

(Continued)

*Primary Examiner*—Shuwang Liu
*Assistant Examiner*—Kenneth Lam
(74) *Attorney, Agent, or Firm*—Allen, Dyer, Doppelt, Milbrath & Gilchrist, P.A.

(57) ABSTRACT

A communications device includes a time/frequency error measurement circuit that receives a communications signal and measures its timing and frequency errors. A Kalman filter receives the communications signal from the time/frequency error measurement circuit and processes the signal using a multi-level state error covariance matrix P for controlling the Kalman gain in the Kalman filter. An on-line monitoring circuit is operative with the Kalman filter for monitoring the actual state errors in time and frequency and controlling the state error covariance matrix P based on a measured error threshold.

19 Claims, 14 Drawing Sheets

U.S. PATENT DOCUMENTS

2008/0240260 A1* 10/2008 Heidari et al. .............. 375/260

FOREIGN PATENT DOCUMENTS

WO 00/63646 10/2000

OTHER PUBLICATIONS

E.V. Stansfield, "Introduction to Kalman Filters", Thales Research Ltd., Reading, Kalman Filter Tutorial, Kalman Filters, Applications and Pitfalls, Heckfield Place, Mar. 7, 2001, pp. 1-7.
Gary Welch & Gary Bishop, "An Introduction to the Kalman Filter", Dept. of Computer Science, UNC, Chapel Hill, TR 95-401, Apr. 5, 2004, pp. 1-16.
Dan Simon, "Kalman Filtering", Embedded Systems Programming, Jun. 2001, pp. 72-79.
Robert Grover Brown, Patrick Y.C. Hwang, "Introduction to Random Signals and Applied Kalman Filtering", second edition, copyright 1983, 1992 by John Wiley & Sons, Inc., sections 5.3-5.6, pp. 219-244, sections 6.1-6.4, pp. 253-275, section 9.4, pp. 380-388.
Applied Optimal Estimation, written by the Technical Staff, The Analytic Sciences Corp., edited by Arthur Gelb, "Optimal Linear Filtering", section 4.2, pp. 102-119, section 4.4, pp. 126-126-131.
Applied Optimal Estimation, written by the Technical Staff, The Analytic Sciences Corp., edited by Arthur Gelb, "Linear Dynamic Systems", section 3.8 & 3.9, pp. 78-97.
Applied Optimal Estimation, written by the Technical Staff, The Analytic Sciences Corp., edited by Arthur Gelb, "Implementation Considerations", sections 8.1-8.4, pp. 278-315.
Andrew H. Jazwinski, "Stochastic Processes and Filtering Theory", Mathematics in Science and Engineering, vol. 64, pp. 266-325.
X. Rong Li, Vesselin P. Jilkov, Dept. of Electrical Engineering, University of New Orleans, "A Survey of Maneuvering Target Tracking: Dynamic Models", Proceedings of SPIE Conference on Signal and Data Processing of Small Targets, Orlando, FL, Apr. 2000, pp. 1-24.
Robert J. Fitzgerald, "Divergence of the Kalman Filter", IEEE Transactions on Automatic Control, vol. AC-16, Dec. 1971, pp. 151-162.
A. H. Jazwinski, "Adaptive Filtering", reprinted w/permission from Automatica, vol. 5, Jul. 1969, pp. 164-174.
Raman K. Mehra, "On the Identification of Variances and Adaptive Kalman Filtering", IEEE Transactions on Automatic Control, vol AC-15, Apr. 1970, pp. 175-184.
H. Heffes, "The Effect of Erroneous Models on the Kalman Filter Response", IEEE Transactions on Automatic Control, vol. AC-11, Jul. 1966, pp. 133-135.
T.T. Soong, "On A Priori Statistics In Minimum-Variance Estimation Problems", Trans, ASEM, J. Basic Eng., Series 87D, Mar. 1965, copyright by The American Society of Mechanical Engineers, pp. 129-132.
A. H. Jazwinski, "Stochastic Differential Equations", Mathematics in Science and Engineering, vol. 64, pp. 92-105, pp. 134-137.
Ara Patapoutian, "On Phase-Locked Loops and Kalman Filters", IEEE Transactions on Communication, vol. 47, No. 5, May 1999, pp. 670-672.
Ara Patapoutian, "Application of Kalman Filters With a Loop Delay In Synchronization", IEEE Transactions on Communication, vol. 50, No. 5, May 2002, pp. 703-706.
Gernando M.G. Sousa & Jose M.N. Leitao, "Carrier Tracking and Symbol Timing in Highly Accelerative Mobile Communications", Instituto de Telecomunicacoes, Instituto Superior de Engenharia de Lisboa.
Joseph I. Statman & William J. Hurd, "An Estimator-Predictor Approach to PLL Loop Filter Design", IEEE Transactions on Communications, vol. 38, No. 10, Oct. 1990, pp. 1667-1669.
Grant S. Christiansen, "Modeling of a PRML Timing Loop as a Kalman Filter", 1994, IEEE Globecom, IEEE Communications Society, pp. 1157-1161.
Chaichanavong et al, "Kalman Filtering Applied to Timing Recovery In Tracking Mode", IBM Almaden Research Center, San Jose, CA, pp. 1-12.
Peter F. Driessen, "DPLL Bit Synchronizer With Rapid Acquisition Using Adaptive Kalman Filtering Techniques", IEEE Transactions on Communication, vol. 42, No. 9, Sep. 1994, pp. 2673-2675.
Larsen et al, "Incorporation of Time Delayed Measurements in a Discrete-Time Kalman Filter", Proceedings of the 37th IEEE Conference on Decision and Control, Tampa, FL, Dec. 1998, pp. 3972-3977.
Eric W. Nettleton & Hugh F. Durrant-Whyte, Australian Centre For Field Robotice, Dept. of Aeronautical, Mechanical & Mechatronic Engineering, The University of Sydney, NSW 2006, Australia, "Delayed and Asequent Data in Decentralised Sensing Networks".
Bernard Friedland, "Treatment of Bias In Recursive Filtering", IEEE Transactions on Automatic Control, vol. AC-14, Aug. 1969, pp. 359-367.
Bruno Sinopoli et al, "Kalman Filtering With Intermittent Observations", IEEE Transctions on Automatic Control, vol. 49, No. 9, Sep. 2004, pp. 1453-1464.
Keshu Zhang et al, "Optimal Update With Out-Of-Sequence Measurements", IEEE Transactions on Signal Processing, vol. 53, No. 6, Jun. 2005, pp. 1992-2004.
Ping Lian, "Improving Tracking Performance of PLL In High Dynamic Applications", Dept. of Geomatics Engineering, University of Calgary, USGE Reports, No. 20208, Nov. 2004, pp. iii-147.

* cited by examiner

SYSTEM ASSUMPTIONS

PROCESS MODEL $\quad X_{k+1} = \Phi_k X_k + W_k$

MEASUREMENT MODEL $\quad Z_k = H_k X_k + V_k$

FIG. 4

MODEL ASSUMPTIONS
A PRIORI CONDITIONS $E\{W_k\} = 0$ $E\{V_k\} = 0$ $E\{W_k W_i^T\} = \begin{cases} Q_k, & i = k \\ 0, & i \neq k \end{cases}$ $E\{V_k V_i^T\} = \begin{cases} R_k, & i = k \\ 0, & i \neq k \end{cases}$ $E\{V_k W_i^T\} = 0, \ \forall i,k$

FIG. 5

SYSTEM AND METHOD FOR AUTOMATIC RECOVERY AND COVARIANCE ADJUSTMENT IN LINEAR FILTERS

GOVERNMENT LICENSE RIGHTS

U.S. Government has a paid-up license in this invention and the right in limited circumstances to require the patent owner to license others on reasonable terms as provided for by the terms of Contract No. AEHF-NMT N00039-04-C-0011.

FIELD OF THE INVENTION

The present invention relates to communications, and more particularly, this invention relates to automatic recovery and covariance adjustment in linear filters such as Kalman filters.

BACKGROUND OF THE INVENTION

Linear filtering based on second-order statistics, such as a mean square error (MSE), requires accurately modeled dynamic systems and noise processes. Examples of filtering algorithms using second-order statistics include Kalman filters, extended Kalman filters (EKF) and its variants, Wiener Filters, and Unscented Kalman Filters. The estimators in these filters are linear functions of the data. These filters have optimalilty properties in the sense of minimum mean square error (MMSE) because the underlying system is linear and Gaussian. However, despite theoretical optimality, due to the real-world nature of the application of the filtering system estimation errors occur. Sources of error may be due to mis-matched dynamics (e.g. such as drift or unforeseen disturbances) and/or non-stationary and/or non-Gaussian noise components. A trivial example of mismatched system dynamics between an assumed model and the underlying physical process is where a value is assumed to be constant for all time, but in fact varies say due to a time-varying phenomena (e.g. thermal gradients). Thus the value modeled as constant is actually a random-walk process. If the random walk is not modeled, the measurements used to drive the filter will have resulting in large error residuals and a complete breakdown of the assumptions that lead to optimality of the solution, and further the model may be completely unusable for the purpose intended (e.g. control, on-line fault monitoring, signal tracking).

It is inevitable that in the modeling of complex systems of practical interest some mis-modeling will occur. One method to counter the deleterious effects of mis-modeling of the physical dynamics is to artificially increase the noise components driving the system model (e.g. specifically the process noise). Additionally there is the potential for unforeseen disturbances (e.g. impulse disturbances) to be applied to a system, which serve to drive the system far from its nominal operating point and render the linear filter useless (e.g. erroneous outputs) for a significant length of time due to the memory of the filter. It is well known the recursive systems like Kalman filter are infinite-impulse response systems (IIR), and hence have (in theory) infinite memory.

There is an additional problem in that recursive second-order filters, like Kalman filters, have a tendency to become "overconfident" when operated for long periods of time. The term "overconfident" implies that additional data has a decreased impact in the recursion such that (in Kalman terminology) the Kalman gain applied to an innovation (or residual) approaches zero as data is accumulated. This effect is predictable due to the theoretical state error covariance matrix $P_T$ decreasing as the recursion length increases. An under-appreciated fact in the application of Kalman filters is that the state error covariance matrix $P_T$ is not the true state error covariance. It is merely the modeled state error covariance matrix assuming perfect models and depends not on any measurements at all, but merely the recursion index. Thus, in essence, the state error covariance matrix $P_T$ can be viewed as a pre-planned recipe for (indirectly) controlling the amount of true measured error residual into the filter recursion. It is very desirable to include a mechanism to prevent the filter from becoming "overconfident" in the theoretical predictions. Otherwise, as a result, the unforeseen, e.g., any unmodeled system changes cannot be adapted to, and thus, system performance is unacceptably poor.

Thus, from the above preliminary discussion it should be clear that mechanisms to compensate or adapt the model of complex physical systems are needed.

To reduce the impact from the decaying effect of new data, some prior art systems, for example, have artificially increased the modeled process noise (often denoted as Q), while other systems, for example, may limit the Kalman gain to minimum values. These approaches are ad-hoc and often lead to undesired performance trades such as poor steady state performance.

Other systems buffer the incoming data over a moving window and implement the system model as a limited memory filter. This approach also negatively impacts some aspects of system performance, most notably the steady state error achievable.

Still other implementations may attempt monitoring of the on-line performance using error residuals (i.e. the difference between the predicted measurement from the filter and the actual measurement taken over a sequence of time indices) and use an ad hoc modification of the $P_T$ matrix to compensate for detectable artifacts (e.g. non-zero correlation, non-zero mean, or non-Gaussianity) in the error sequence. This requires significant additional signal processing resources for an analysis of the error sequences which may negatively impact a resource constrained system.

Still other systems may employ use multiple model filtering which in its most basic terms selects a filtering mode (i.e. a system model from a group) that fits the current dynamic situation. However, this obviously increases the computational load which may be unacceptable in some instances.

The current invention addresses the shortcomings of existing approaches and introduces a novel way of compensating for unforeseen disturbances and mis-modeling errors without sacrificing system performance and allowing all physically motivated system variables (e.g. process noise, measurement noise, model order) to retain their inherent physical significance and the resulting is applied in a communication system context.

SUMMARY OF THE INVENTION

A communications device includes a time/frequency error measurement circuit that receives a data signal and measures the timing and frequency errors for the purpose of adjusting the reception system to properly demodulate the data signal. A Kalman filter is operative to receive the measurements from the time/frequency error measurement circuit and process the errors for adjusting the internal state of the communications device. The adjustment uses a multi-level state error covariance matrix P for controlling/adapting the Kalman gain. The multi-level nature of the state error covariance matrix P is the key to compensating for any a-priori mis-modeling of system dynamics relative to the actual application and also for unforeseen disturbances and noise components. An on-line monitoring circuit is operative with the Kalman filter for monitoring the actual state errors (i.e. the residuals) in time and frequency and controlling the state error covariance matrix P based on a measured error thresholds.

The levels within the multi-level state error covariance matrix P are defined initially as true initial state errors corresponding to that which prevail to enter a state (e.g. "seed values"). These are physically motivated in an application and dictated by system analysis such that maintaining a true state error below a given value will provide acceptable performance for the level. Each level may correspond say to improved capability such as tighter tolerance tracking to support higher data rates in a communication context.

At each time step in the processing there are 2 choices the system makes regarding the P matrix depending on the residual values monitored. In option 1, the residuals indicate that no corrective action on the P matrix is warranted and the Kalman filter runs according to the theory. In option 2, the residuals indicate a potential mis-modeling (e.g. a sequence of residuals greater than some allowable value) and the state error covariance matrix P is reset from its current value (e.g., in level j) to the value to enter level j−1. This is conceptually similar to "opening up bandwidth" to recapture a signal in a phase lock loop application.

In one aspect of the invention, the multi-level state error covariance matrix P is formed as a predetermined set of threshold values determined from a look-up table as a plurality of tracking states derived from physical analysis and application dependent system requirements. In yet another aspect of the invention, say the system is operating in state j, when the error covariance matrix has decreased below a threshold level for state j+1, the system recognizes this and indicates it is now operating in track state j+1 as the current state. The value of state j+1 over state j is that tighter tracking tolerances (i.e. errors) has been achieved when may allow say higher data rate services to be sustainable.

In yet another aspect of the invention, should the error residuals indicate that the current track state is not appropriate (e.g. the variance of a sequence of error measurements is too large) then the system degrades the current track state from state j to state j−1 and reseeds the state error covariance matrix with the predetermine state error covaraincs suitable for attempting maintenance of track state j−1. The covariance values are found from a look-up table which as mentioned is populated using application dependent system analysis.

To one skilled in the art the propagation of the state error matrix in this way is physically motivated. Meaning, that when the residuals are progressing towards lower variances as the filter converges, the state estimates are truly approaching (in the mean-square sense) the underlying physical values. But to the contrary, when the error variances are large, then the true state error is not well modeled by the prevailing state error covariance and corrective action is required. In this invention the corrective action to reseed to the state error covariance matrix with physically motivated values so that the state error covariance matrix used in the system is physically meaningful and not simply a mathematical artifice as the traditional prior art systems.

In yet another aspect, the Kalman filter can also be operative for producing minimum mean square error (MMSE) estimates of timing and frequency errors.

In yet another aspect, a time/frequency tracker is operative to acquire and track time and frequency variations and synchronization signals conveyed over communications links. The time/frequency tracker can be operative to synchronize the receiver clock with a clock signal embedded within the communications signal. A front-end demodulator can incorporate the receiver clock as part of a receiver.

A communications system and method are also set forth.

BRIEF DESCRIPTION OF THE DRAWINGS

Other objects, features and advantages of the present invention will become apparent from the detailed description of the invention which follows, when considered in light of the accompanying drawings in which:

FIG. 4 shows system assumptions with the process model and measurement model used for a Kalman filter.

FIG. 5 shows model assumptions used for a Kalman filter.

DETAILED DESCRIPTION OF THE PREFERRED EMBODIMENTS

Figure 1:
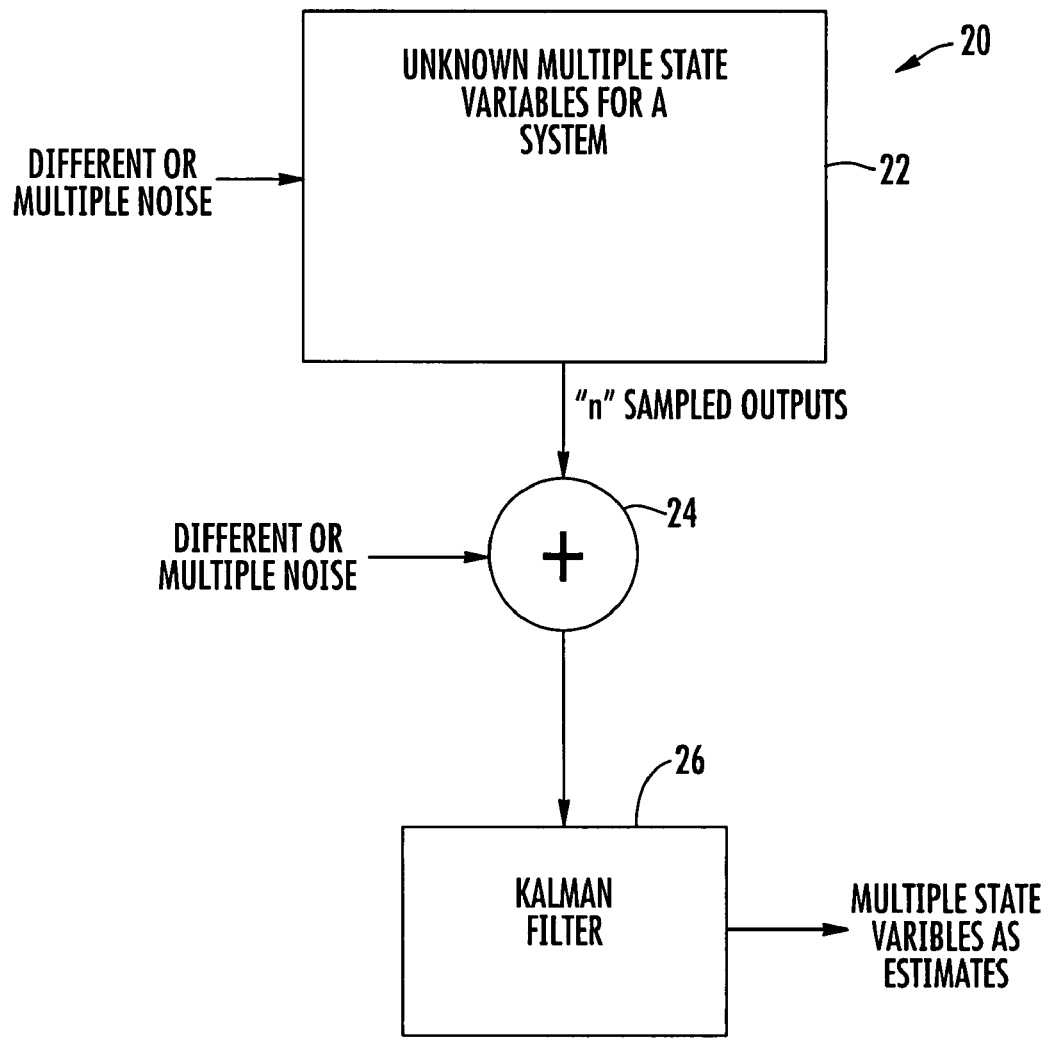
FIG. 1 is a block diagram showing for explanation a Kalman filter that estimates in real time the states of the system.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited to any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

There now follows a more detailed description in accordance with a non-limiting example of the present invention. For purposes of explanation, reference should be made to commonly assigned copending patent application Ser. No. 11/384,868, filed on Mar. 20, 2006 by the same inventors and entitled, "TIME/FREQUENCY RECOVERY OF A COMMUNICATIONS SIGNAL IN A MULTI-BEAM CONFIGURATION USING A KINEMATIC-BASED KALMAN FILTER AND PROVIDING A PSEUDO-RANGING FEATURE," the disclosure which is hereby incorporated by reference in its entirety. That application explains in detail a Kalman filter-based time-frequency tracker (TFT) module that operates in a kinematic domain, including range, velocity and acceleration. The algorithms and terms used in that application apply to the instant application, including definitions such as the continuous time filter definition, the measurement vector $Z_k$, and measurement matrix $H_k$, measurement noise covariance matrix $R_k$, and the process noise covariance matrix $Q_k$. That application explains a Kalman filter initialization, theory and mathematics of same. That Kalman filter is operative to estimate a current state in the Minimum Mean Square Error (MMSE) sense, using previous data and system parameters. The application explains a continuous time filter, the state vector in pseudo-kinematic variables, and a state transition matrix. A detailed explanation of a time/frequency tracker (TFT) that acquires and tracks time and frequency variations in synchronization signals conveyed over communications links and which can be updated with data representative of kinematic domain measurements carried with respect to the receiver terminal is also set forth. Other TFT embodiments are described. Further technical details can be found in that copending '868 application and should be referred to understand more theory of operation of the Kalman filter that can be incorporated for use with the present invention.

There now follows a brief explanation of a Kalman filter to better understand the different embodiments. It should be understood that a Kalman filter is an efficient recursive filter that estimates the state of a dynamic system from incomplete and noisy measurements. The Kalman filter removes noise effects and obtains an adequate estimation of the state, for example, its position and velocity. For example, a radar system could employ a Kalman filter to estimate the current position and velocity through filtering and processing of measurements and also provide estimates of future position and velocity through prediction. These operations are embodied in FIGS. 3-6. In the literature, the Kalman filter is also referred to sometimes as a linear quadratic estimation (LQE) filter and has been used as part of a phase-locked loop (PLL).

More theoretically, Kalman filters are typically based on linear dynamic systems in the time domain and modeled on a Markov chain built on linear operators disturbed by Gaussian noise. The state of the system can be presented as a vector of real numbers. A linear operator is applied to this state to generate a new state.

At each discrete time increment, a linear operator is applied to the state to generate the new state with some noise. Visible (i.e. directly observable or measureable) outputs of the hidden states are generated by a linear operator mixed with noise.

The Kalman filter estimates the internal state of a process using a sequence of noisy observations. The matrices $F_k$, $H_k$, $Q_k$, $R_k$ are specified, and sometimes $B_k$ for each time-step k as described below.

The Kalman filter model assumes that the true state at time k is evolved from the state at (k−1) according to:

$$X_k = F_k X_{K-1} + B_k u_k + w_k$$

where $F_k$ is the state transition model that is applied to the previous state $X_{k-1}$;

$B_k$ is the control-input model that is applied to the control vector $u_k$; and $w_k$ is the process noise that is assumed to be drawn from a zero mean multi-variate normal distribution with covariance $Q_k$:

$$w_k \sim N(0, Q_k).$$

At times k an observation or measurement $z_k$ of the true state $x_k$ is made according to:

$$z_k = H_k x_k + v_k$$

where $H_k$ is the observation model, which maps the true state space into the observed space and $v_k$ is the observation noise that is assumed to be a zero mean Gaussian white noise with covariance $R_k$:

$$v_k \sim N(0, R_k)$$

The initial state and the noise vectors at each step $\{x_0, w_1, \ldots, w_k, v_1 \ldots v_k\}$ are all assumed to be mutually independent.

Figure 2:
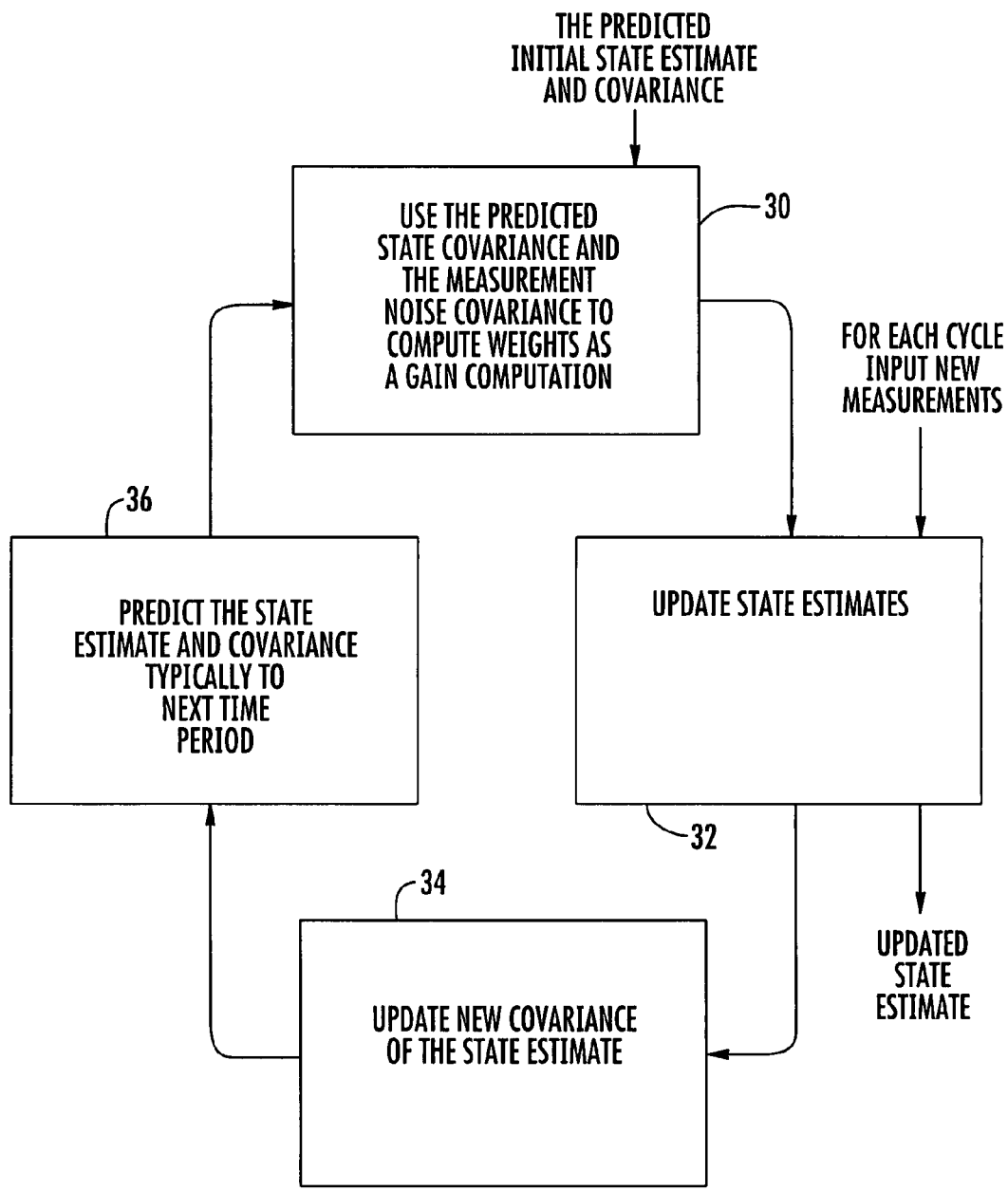
FIG. 2 is a block diagram showing for explanation a Kalman filter algorithm.
Figure 3:
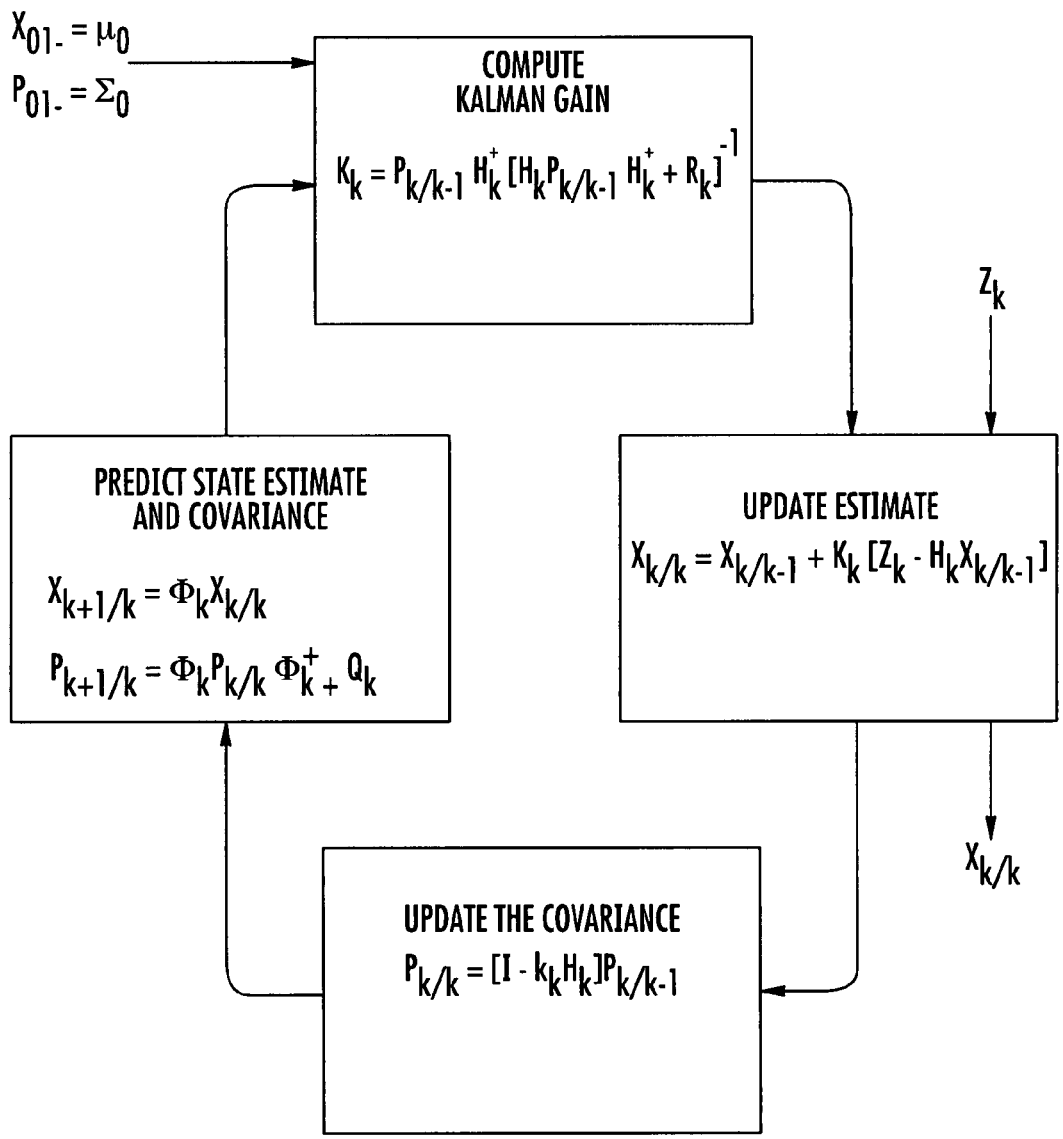
FIG. 3 is a block diagram similar to FIG. 2 showing for explanation greater details of the Kalman filter algorithm and showing the recursive algorithm.
Figure 6:
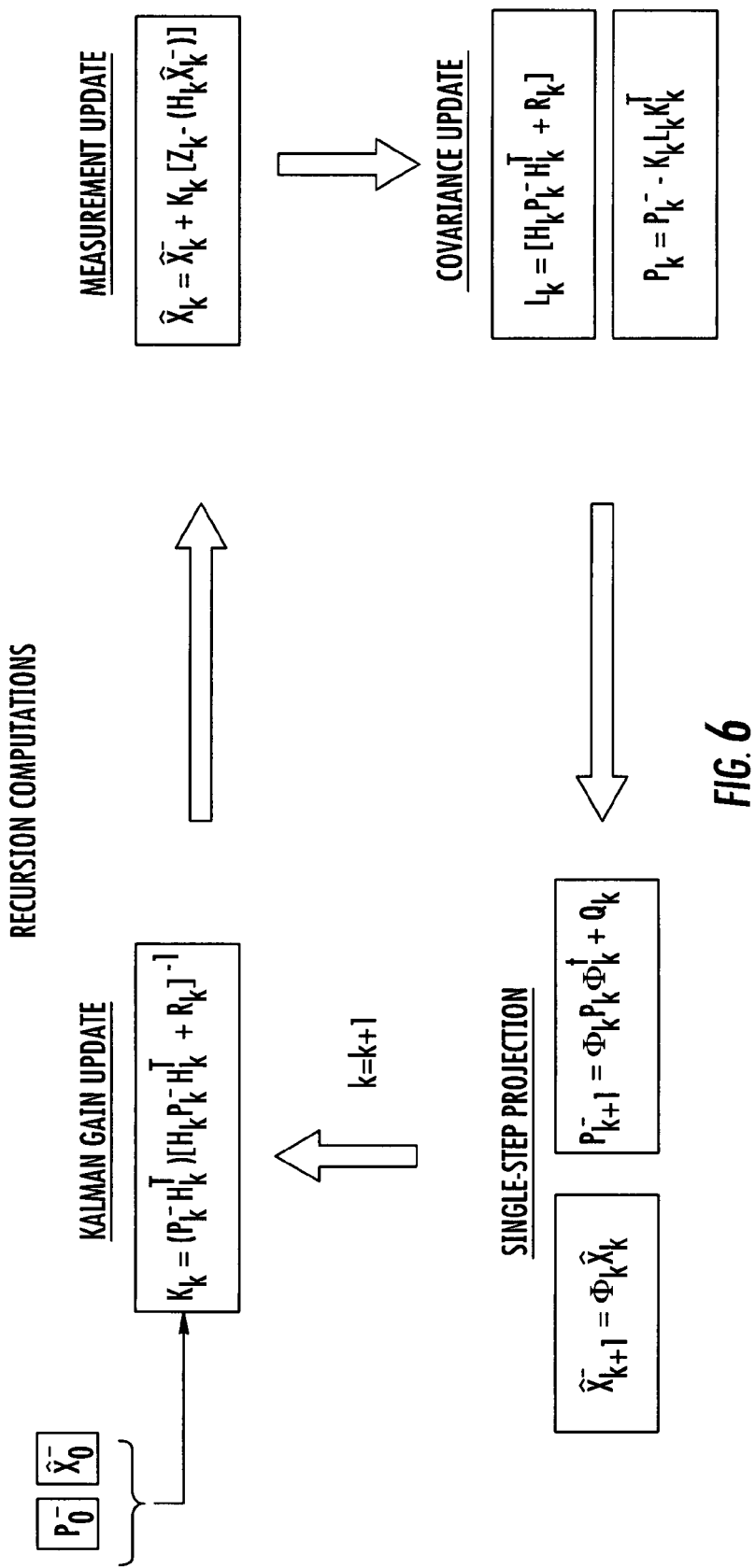
FIG. 6 shows recursion computations for the algorithm similar to that shown in FIGS. 2 and 3 and showing the Kalman gain update, measurement update, covariance update and single-step projection.

The Kalman filter is a time domain filter and recursive estimator where the estimated state from a previous measurement and the current measurement are used to compute the estimate of the current state. Past estimates or observations are not required. The state of the Kalman filter is represented by two variables:

$X_{k|k}$, the estimate of the state at time k after assimilating the data available at time instant k (e.g. meaning one complete recursion cycle as shown equivalently in FIGS. 2, 3 and 6); and $P_{k|k}$, the error covariance matrix, corresponding to a measure of the estimated accuracy of the state estimate at time k after assimilating any data available at time k (e.g. meaning one complete recursion cycle as shown equivalently in FIGS. 2, 3 and 6).

The Kalman filter typically operates in a predict or update state. The predict state uses the state estimate from the previous time to produce a state estimate at the current time. In the update state, a prediction based on current time measurements are used to arrive at a new, more accurate state estimate. The following can apply:

for the predict state:

$$x_{k|k-1} = F_k x_{k-1} + B_k u_k; \text{ and}$$

for the predicted estimate covariance:

$$P_{k|k-1} = F_k P_{k-1|k-1} F_k^T + Q_k$$

FIG. 1 shows basic components of a Kalman filter system 20 in which different signals as multiple noise sources are input into a circuit as unknown multiple state variables for a system 22. Different signals or multiple noise sources and "n" sampled outputs are mixed at a mixer 24 and output to a Kalman filter 26 with Multiple State Variables as Estimates.

FIG. 2 shows an example of a typical Kalman filter algorithm in which the predicted initial state estimate and covariance are input into the system, which uses the predicted state covariance and the measurement noise covariance to compute weights as a gain estimation (block 30). The state estimates are updated (block 32) and each cycle inputs new measurements with the output as updated state estimates. The next sequence updates the new covariance of the state estimate (block 34) followed by predicting the state estimates and covariance typically to a next time period (block 36). FIG. 3 shows the process similar to that shown in FIG. 2 and showing example mathematics of the Kalman filter. FIG. 4 shows system assumptions with the process model and the measurement model. FIG. 5 shows the model assumptions. Further details and explanation can be found in the incorporated by reference '868 application that explains in greater detail the various models, matrix calculations and assumptions.

FIG. 6 is another diagram similar to those shown in FIGS. 2 and 3 and showing recursion computations with the Kalman gain update, measurement update, covariance update and single-step projection. Further details of the recursion computations are set forth in the incorporated by reference '868 application.

Figure 15:
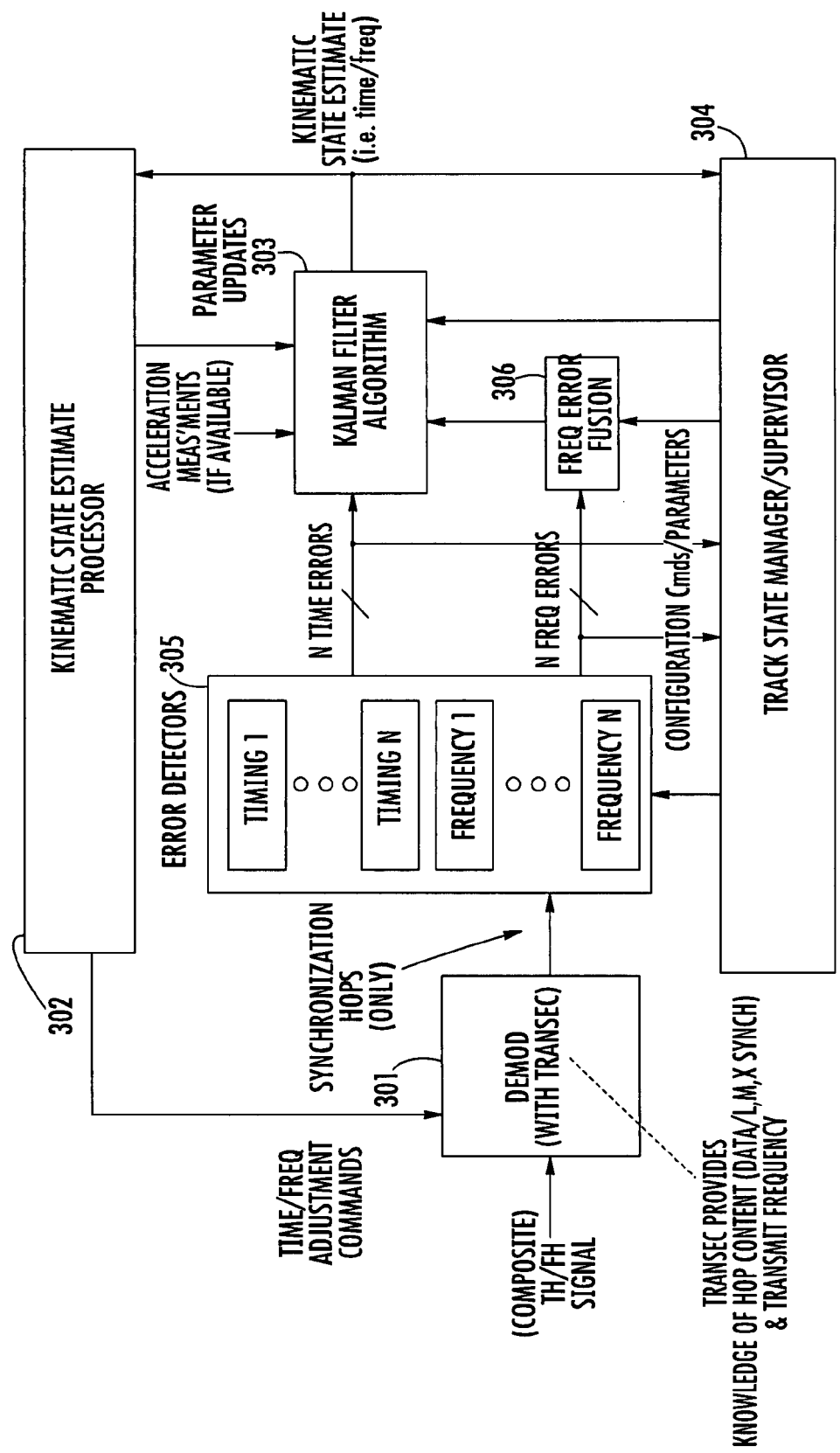
FIG. 15 shows the overall communication system device with the Kalman filter algorithm embedded and operative to control the time and frequency state parameters under the control of the time and frequency errors available from the error detectors operating on the synchronization pulse portion of the incoming data signal.

In operation, the Kalman filter typically operates as a multiple-input, multiple-output digital filter. It estimates in real time the states of a system under observation using a mathematical model of the system. The filter has variables that describe the internal, but typically not directly observable by measurement, system behavior as a function of time. A relevant example would be estimating the position, velocity and acceleration of an object from a sequence of measurements. In general, multiple noisy outputs from the system under consideration operate as a multidimensional signal plus noise input to the filter structure. Noisy measurements are used to estimate the desired "hidden" states which are needed to develop the control for demodulation (FIG. 15). The estimates are statistically optimal and minimize the mean square estimation error.

Because the state or signal is typically a vector of scalar random variables, and not a single variable, the state uncertainty estimate is properly termed a variance-covariance (however often simply stated as covariance matrix) such as for the matrix P. The variance-covariance term arises since each diagonal term of the matrix, say P, is the variance of a scalar random variable as a description of its uncertainty. The term is typically the variable's mean squared deviation from its mean. The off-diagonal terms are the covariances that describe the correlation between the pairs of variables.

The multiple measurements at each time point are also vectors that a recursive algorithm processes sequentially in time. The algorithm iteratively repeats itself for each new measurement vector. It typically uses values stored from the previous cycle. Past measurements are usually not saved.

The filter is operative to calculate an updated state estimate using a new measurement (FIGS. 2, 3 and 6). As a result, the state estimate covariance P is changed to reflect the added information resulting in a reduced uncertainty. The information added is essentially the time step increment as the matrix P is independent of the actual state error when mismodeling may occur. To detect mismodeling the typical filter recursion shown in FIGS. 2, 3, and 6 is augmented with a monitoring of the residual errors which depend on the ability of the Kalman filter to maintain accurate predictions (e.g. models) of the underlying state variables. The updated state estimates and associated covariances form the Kalman filter outputs.

To prepare for the next measurement vector, the filter projects the updated state estimates and covariance to the next measurement time. The actual system state vector changes with time according to a deterministic linear transformation plus an independent random noise. The predicted state estimate follows the deterministic transformation because the actual noise value is unknown. The covariance prediction accounts for both because the uncertainty in the random noise is known. The prediction uncertainty increases because the state estimate prediction cannot account for the added random noise.

As the measurement vectors are recursively processed, the state estimates uncertainty typically decreases because of the accumulated information from the measurements when the states are observable. Any uncertainty in prediction reaches a steady state when the amount of uncertainty is balanced by the uncertainty decrease in the update. If no random noise exists in the actual model when the state evolves to the next step, the uncertainty will eventually approach zero. The weights change because the state estimate uncertainty changes with time. If the state of a system is constant, the Kalman filter reduces to a sequential form of deterministic, classical least squares with a weight matrix equal to the inverse of the measurement noise covariance matrix. The Kalman filter assumes that the system states vector, $x_k$, evolves with time as:

$$x_{k+1} = F_k X_k + w_k$$

with the measurement vector given by:

$$z_k = H_k X_k + v_k$$

where $x_0$, $w_k$, and $v_k$ are mutually uncorrelated vectors. The latter two are white noise sequences with means of $M_0$, 0 and 0 and non-negative definite covariances of $S_0$, $Q_k$ and $R_k$, respectively. The corresponding optimal Kalman filter is given by the recursive algorithm as shown in FIG. 3.

The vector $X_{k/j}$ is the optimal estimate of x at time $t_k$, based on measurements up to $t_j$, and $P_{k/j}$ with the corresponding "optimal" estimation error covariance matrix when the implemented filter model matches the real world system that is actually generating the data.

Figure 7:
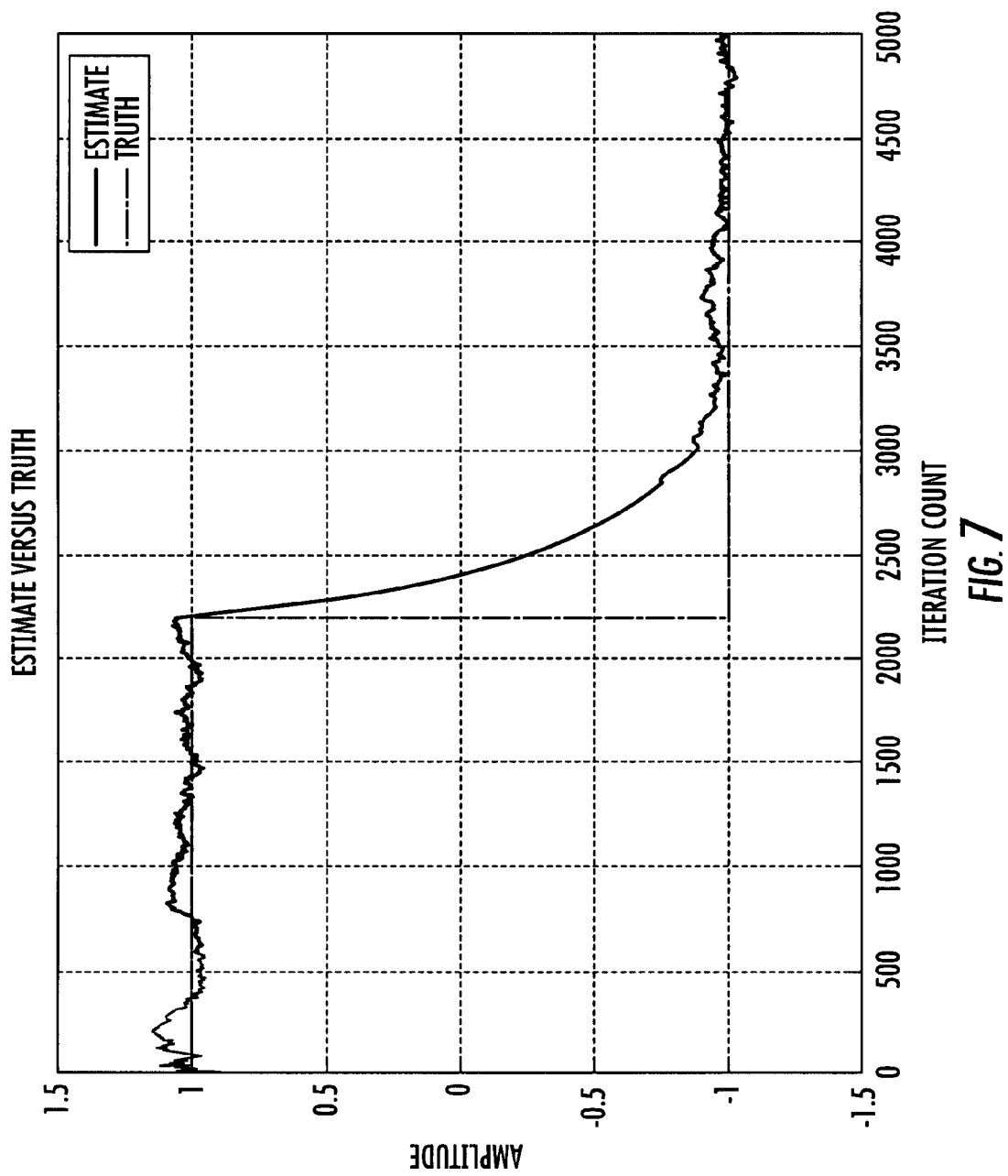
FIGS. 7-10 are graphs showing an example of a bipolar constant with a random switch-point and as an illustrative example of the problems typical of prior art filter systems with the estimate versus truth in FIG. 7, the Kalman gain on residuals as shown in FIG. 8, the theoretical state error covariance estimate versus the true state error as shown in FIG. 9, and the residuals in FIG. 10.
Figure 8:
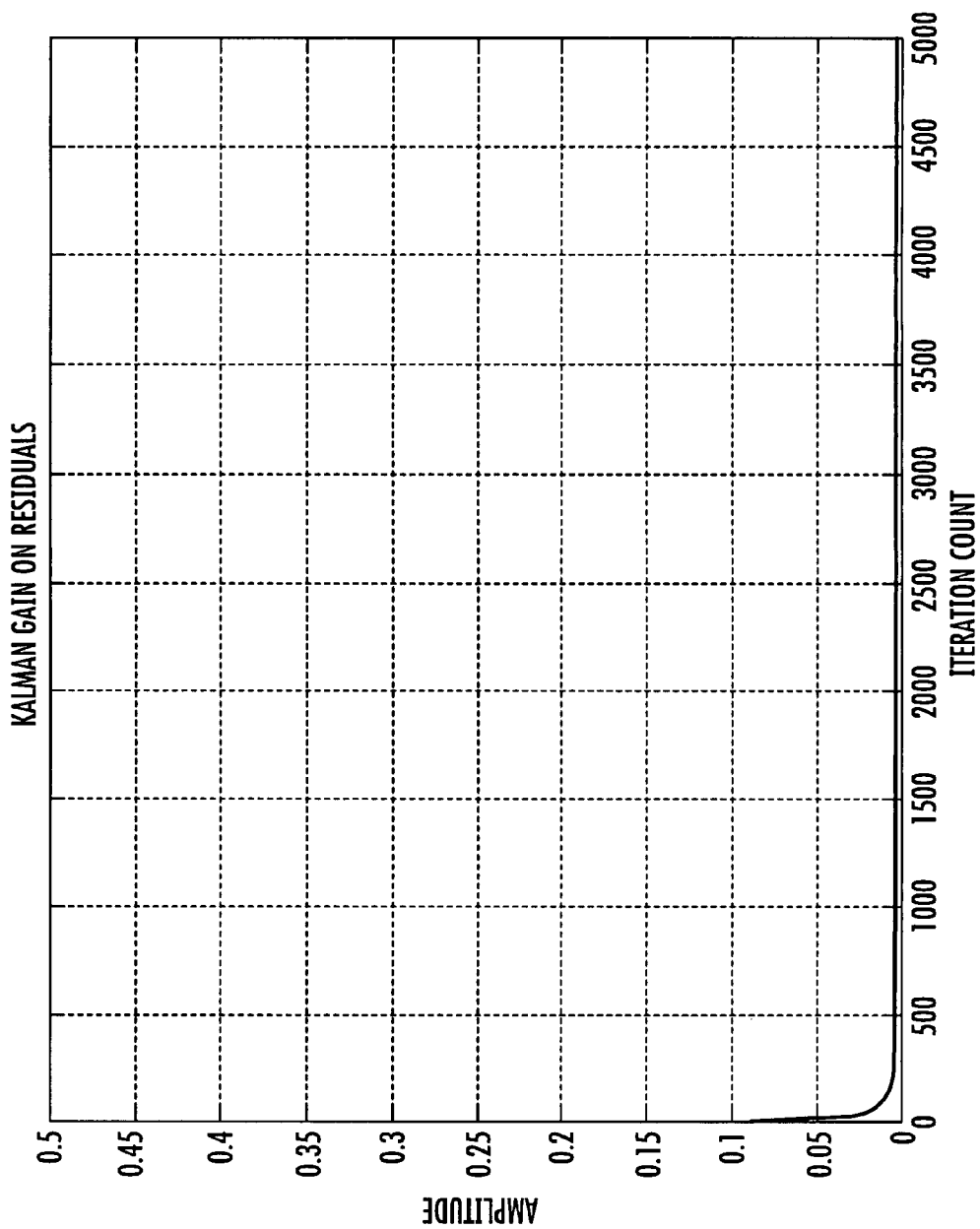

FIGS. 7-10 are graphs of an illustrative example showing a scalar bi-phase constant with random switch-point and showing an example of deficiencies of standard prior art Kalman filter performance results and setting forth typical drawbacks of prior art systems. The scalar nature does not sacrifice generality of the result, it merely serves to simplify presentation of the concepts. In a scalar example FIG. 7 shows the truth amplitude versus the estimate. The variations in the state estimate are due to statistical properties of each measurement accepted by the filter. The filter for this example is a simple scalar assuming a constant value. FIG. 8 shows the Kalman gain on the residue versus the time index. The feature to note is the decay of the Kalman gain toward zero as the time index increases. This is an embodiment of the "overconfidence" discussed above. The Kalman gain is reduced because the state error covariance is trending toward zero as the index increases. The trend is justified if no model disturbances are present.

Figure 9:
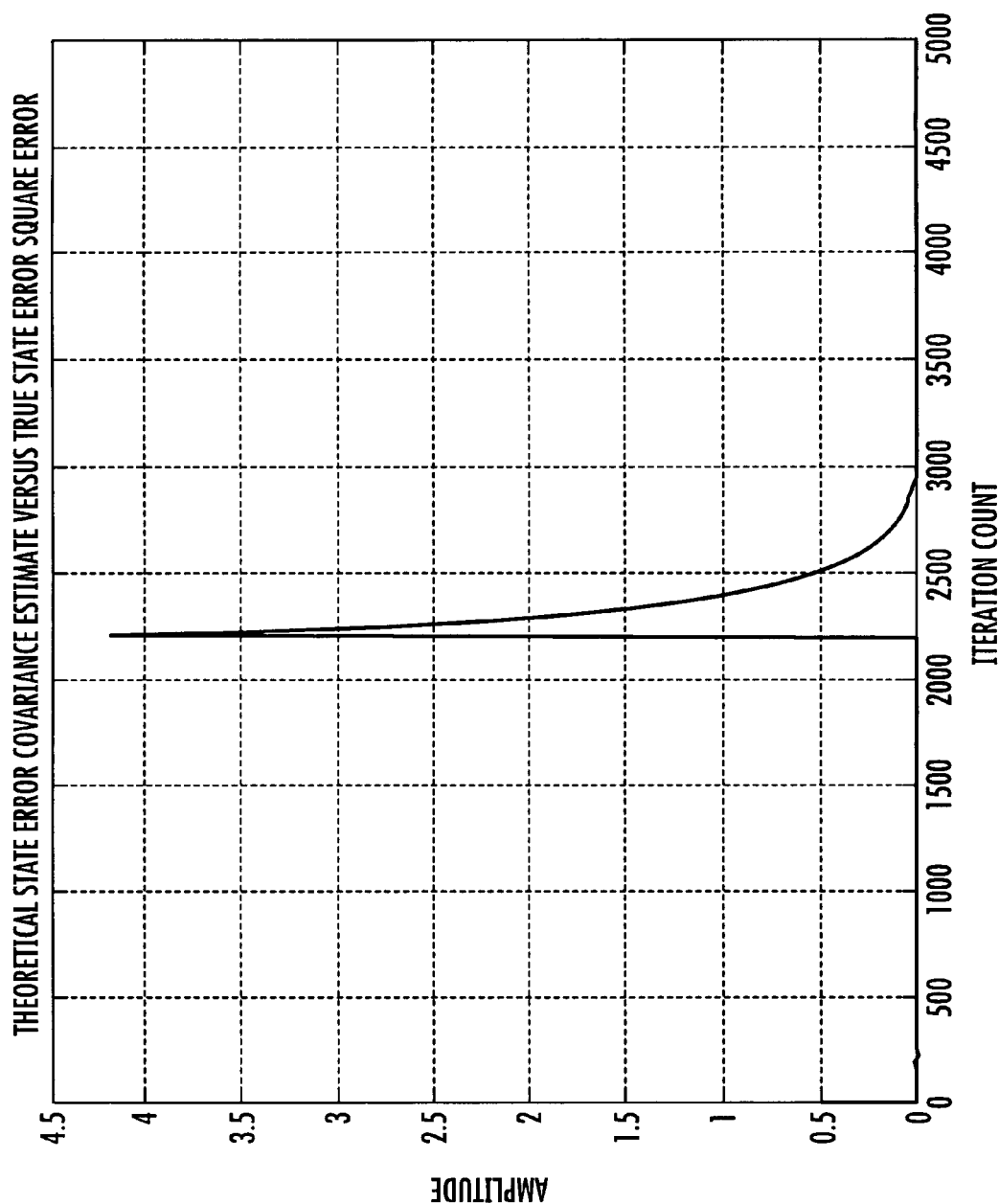
Figure 10:
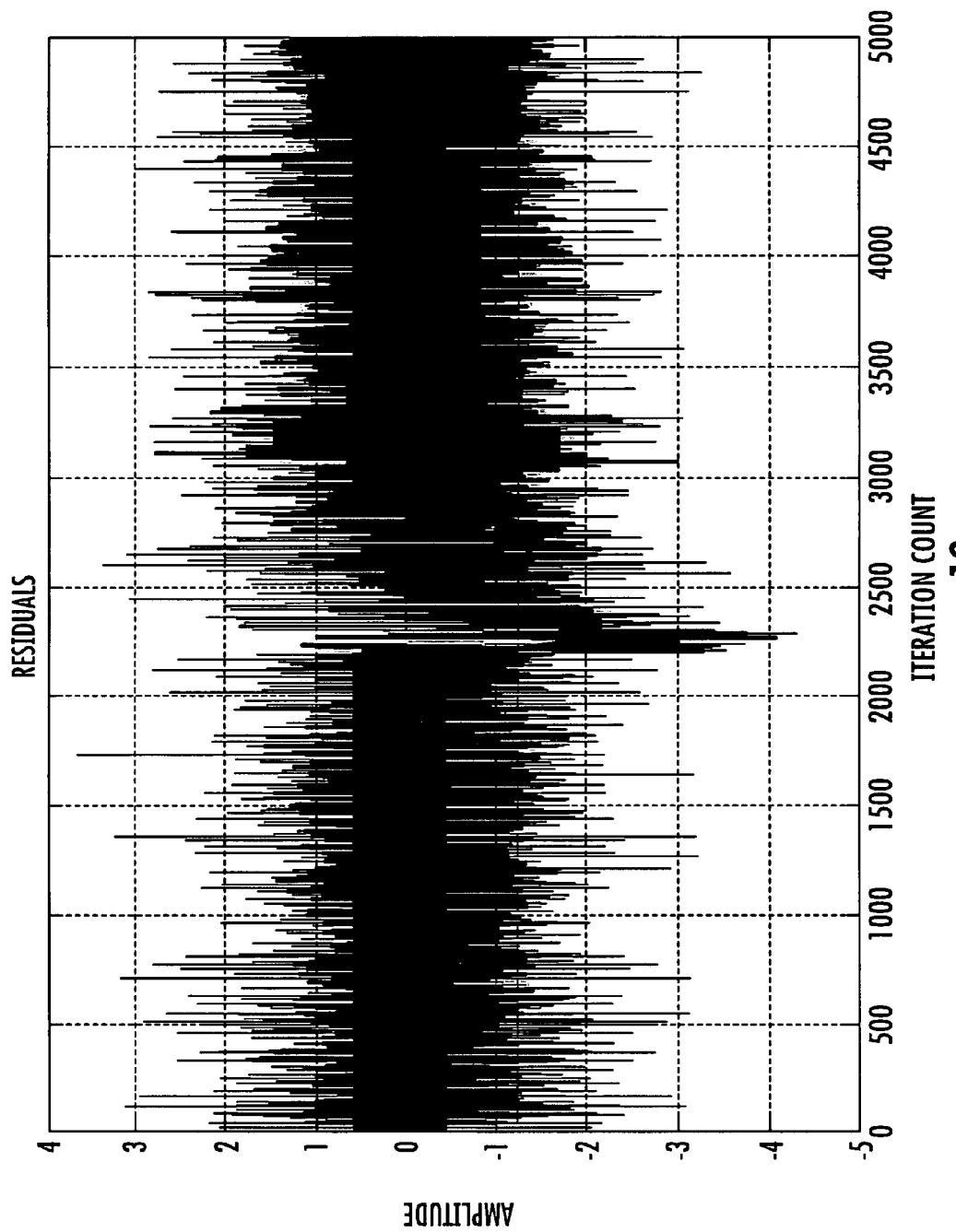

FIG. 9 is similar to FIG. 7, showing the actual state error covariance estimate versus the true state square error over the time indices. The feature to note is that the theoretical state error covariance is near zero (0) for nearly all time, whereas the actual state error "spikes" at the switch point (i.e. nominally step 2250). The deviation from the theoretical P is due to an unanticipated model change (i.e. the phase switch of the scalar constant). However, in the traditional Kalman formalism this "model error" cannot be detected and hence as shown in FIG. 9, a large true state error covariance persists for hundreds of time steps. In many applications this type of error and the length of the error event will cause unacceptable performance degradation. In a communication system context this behavior could cause loss of signal tracking and this leads to potentially unrecoverable burst error events. FIG. 10 shows the residuals versus the amplitude with the iteration count on the horizontal axis the same as in FIG. 8. The key feature is the apparent shift in the residuals from a mean value of zero to something offset significantly from zero around the switch event time step (i.e. step 2250 to ~3000).

As shown in FIG. 7, the drawbacks of a typical prior art system are shown. In this illustrative example the underlying truth has a one (1) value that switches at some random point (step 2250 in this example) and goes to −1 as a bi-phase flip.

The Kalman filter equation has assumed the system to be modeled as a constant (i.e. never anticipating a sign flip nor change in value) and estimates the value of the truth with the process equation as the next state, which is equal to the current state plus some amount of noise. If no noise occurs, then each state is the same as the one previous state.

It should be understood that thousands of samples are graphed on the X-axis with each sample in 1-1 correspondence with the iteration count. The system starts at time index 0 and we assume that any value (for the system constant) will be equally likely. Thus the initial state will have a uniform distribution with zero mean. As is typical of Kalman filter initialization routines the system picks the expected value of the initial state, which in this case as mentioned is zero. The convergence to the truth value of unity can be seen in the first few time instants of FIG. 7.

To place this in a communications context consider for example, at around 2,250 iterations on the graph of FIG. 7, the truth switched to −1 and the Kalman filter has residuals, such as based on differences between the measured error and an estimate of the mean or median of the error values. The error will lag. Eventually, it obtains the true value and the lag is about 2,200 to about 3,500 or about 1,300 iterations. This is not adequate if the system attempts to track real time changes. The system may not be able to afford to be inaccurate for that length of time, such that the timing state is poor. For example, if the system corresponded to a hopping frequency used in communications with a +1 as the first frequency and a −1 as the second frequency, there would be an extended time period when the Kalman filter was slewing to the appropriate frequency. During the slew, communication performance (e.g. bit error rate) is likely unacceptably poor.

To repeat, FIG. 8 shows the Kalman gain on the residuals. The gain went to almost zero (0) because of the theoretical model. FIG. 9 shows the true state error because of the deviation between the truth and the error. FIG. 10 shows the error on the residuals regardless of what actually happened. The residuals are measured based on the measurement equation and take a large increase. It is evident from the graphs in FIGS. 7-10 that there is a slow response.

Figure 12:
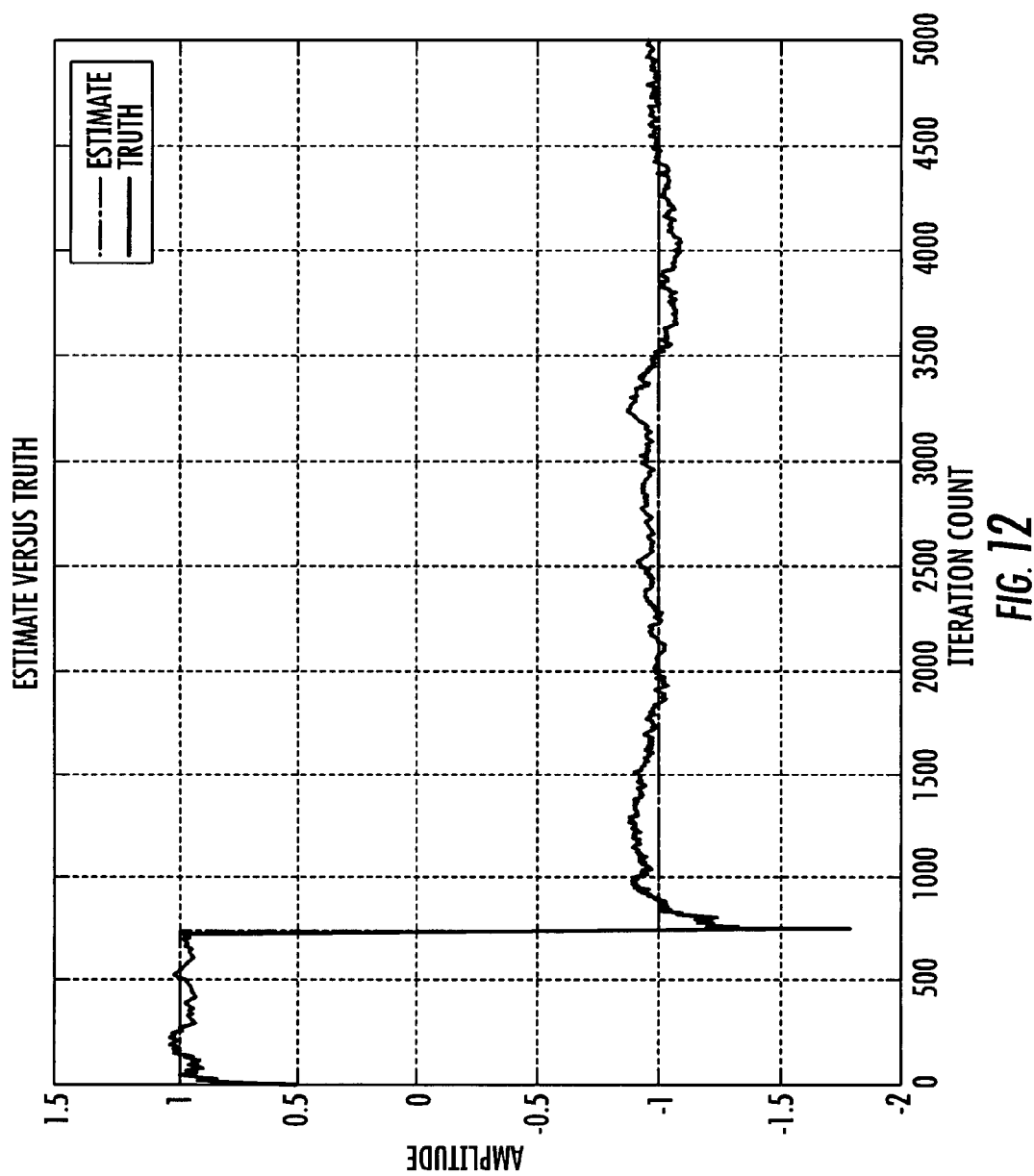
FIGS. 12, 13 and 14 are graphs showing the improved Kalman filter response in accordance with a non-limiting example of the present invention and showing graphs similar to the graphs shown in FIGS. 7-10, and showing the quicker response due the impact of the bi-level state error covariance matrix P.
Figure 13:
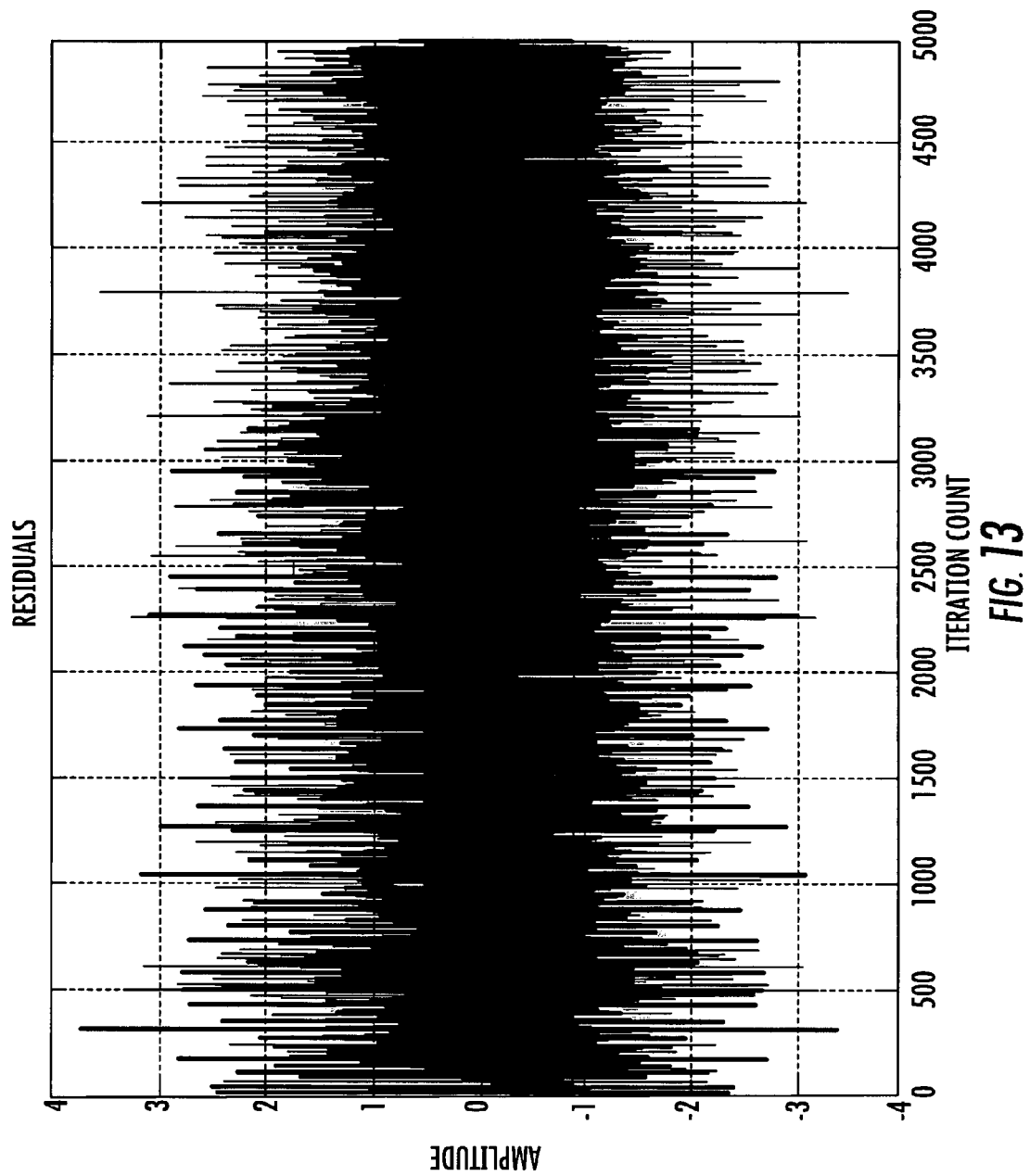
Figure 14:
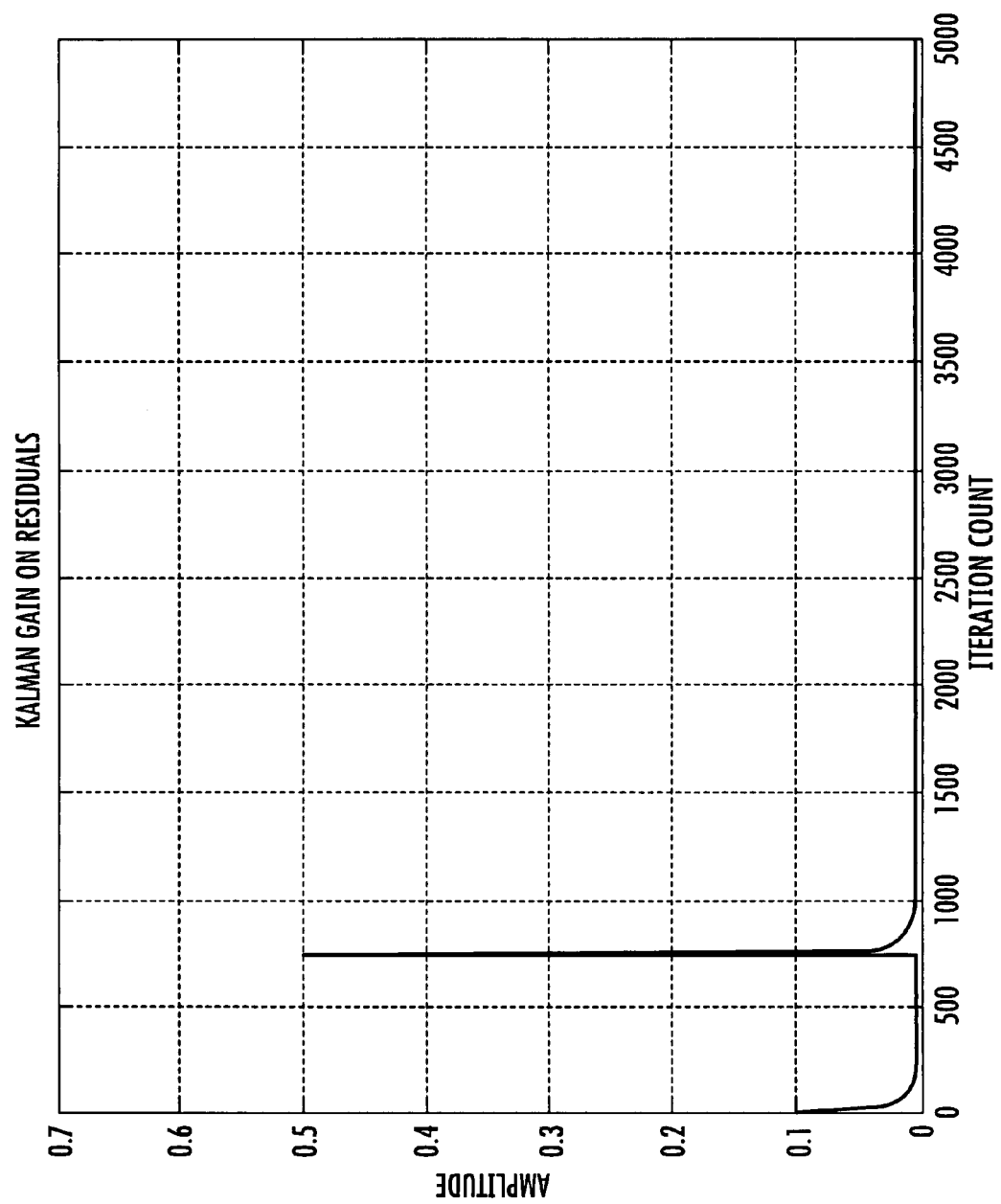

FIGS. 12-14 show performance results in accordance with a non-limiting example of the present invention. FIG. 12 illustrates that when encountering a switch point at some random time (FIG. 12) the system can recover in a much faster fashion that the traditional systems (FIG. 7). FIG. 12 illustrates that the system can respond to the underlying change in the underlying system and accentuates it to recover quickly to provide an adequate estimate of the new state (i.e. the −1 state value). FIG. 14 indicates the system performance in terms of residuals and compared to FIG. 10 typical of prior art there is no noticeable "bump" in residuals which indicates superior tracking capability of the present invention. The system is operative to drives the Kalman gain as shown in FIG. 14, a weight is placed on a residual when the Kalman gain is pushed up until the residuals come down to a manageable amount. This is controlled by the temporary inflation of the state error covariance P introduced as a seed value. In the communication context there might be many levels for the values in P, say 10 levels. But for the purpose of illustration only 2 have been used here.

There now follows an explanation of the improvements and embodiments as related to a communications device. In accordance with a non-limiting example of the present invention. The state error covariance matrix P is controlled for covariance adjustment. In the non-limiting examples of the present invention, the state error covariance P is a primary control for the Kalman Gain (K), which is the degree to which new data as residuals (innovations) are used on projected data. Other "handles" exist and have been used in other prior art but they can hurt long-term estimation performance (e.g., process noise Q).

$$P_{k+1}^- = \Phi_k P_k \Phi_k^T + Q_k$$

$$K_k = (P_k^- H_k^T)[H_k P_k^- H_k^T + R_k]^{-1}$$

$$\hat{x}_k = \hat{x}_k^- + k_k[z_k - (H_k \hat{x}_k^-)]$$

Φ corresponds to the state transition. K is the "degree" to which the new data (innovations) are used on the projected data. The theoretical error covariance P still decreases with increasing iteration count. In a communication context we can think of P equivalently as a system recursively narrowing a bandwidth tracking system with controlled bandwidth jumps, for example, a dynamically programmable phase locked loop.

The innovated system uses a multi-level (or stratified) state error covariance matrix P, where state entry levels (i.e. reseed values) are defined as true initial errors required to support that state. These values, as well as the number of levels, are application dependent. The actual state errors for time and frequency are monitored on-line in a feedback configuration (FIG. 15). A direct time/frequency error measurement and processing sub-system is used (FIG. 15). When excessive time and/or frequency errors are measured by variance, the system will reset the current value of the P matrix to a reseed value P by dropping back a state level and essentially "open up" the bandwidth to accommodate the level of error residual. The variance measurement used in the invention is computed over a consecutive number of application dependent samples. In the illustration the value is 100.

In the invention, the initial values for seeding P at any level are the physically derived state errors (i.e. for time/frequency) defined by the maximum error tolerable for a track state. The maximum tolerable errors for any communication application is directly related to the data rates desired to be supported.

With multiple state variables (e.g. multiple simultaneous users) it is possible to diagonalize P when switching states to lower quality states and beneficial operation occurs with this method as cross-correlations possibly inherent in poor models are erased each time the covariance is reseeded.

The system has straightforward detection of actual errors as residuals that are subtracted from the measurement in the system. In this system, the expected time of arrival and frequency of a synchronization pulse is obtained and the residuals are measured (FIG. 15 and co-dependent application). One advantage of this approach is that no additional computation is required, as it saves gates and CPU cycles. Errors (i.e. residuals) are directly measured and are processed by combining a moving average processing and median processing, such as a 25 sample moving average for frequency error detection. Frequency error detectors are used and respond better to a median for processing the average. Subsequent processing is accomplished prior to applying the residuals into the measurement equation. The system can use all the data collected in recursion. This approach can approach a theoretical optimum result because the process noise is not driven up corresponding to the Q matrix (i.e. process noise). Using Q to compensate for errors is a common practice, but has the effect of "motorboating" or "seeking" about the true value and prevents the ultimate accuracy from being achieved. In short the Q matrix is a constant for all time, so any mis-adjustment in this factor penalizes performance for all time.

Also, in our approach, no additional memory is required for FIR (Finite Impulse Response) type systems unlike some a prior art that is based on moving average windows which require additional state variable memory.

In our approach only the state error covariance matrix P is used in corrections of detected model errors. This allows a beneficial trade of long-term accuracy for short-term recovery properties. This frees the system designer to use a measurement noise matrix (R) and process noise matrix (Q) to be physical motivated, unlike other prior art methods. Typically one has good knowledge of the measurement system and its errors, which allow precise knowledge of the R matrix. Similarly, if one wishes to assume a good state of knowledge about the underlying system, a small Q can be used which can lead to superior performance. If however, the Q matrix is artificially altered (as in some prior art systems) to account for mis-modeling, it typically is not the true process noise which can have negative consequences when trying to model physical phenomena.

Our system alters a "fictitious" variable, namely the theoretical state error covariance matrix $P_T$. Using this "handle" we can derive a fully physically motivated model (as best as possible) and adjust the model (i.e. the track state level and transient recovery) as necessary during operation using a single variable (the P matrix). As mentioned typically in application P has nothing to do with the underlying true physics, we in defining the multi-level nature periodically adjusts P when dictated by the underlying physics as monitored using the true error residuals. The feedback system configuration allows P to update on an as-needed basis as a type of corrective action.

The state error matrix P carried along in each time index is increased in the event the variance of residual errors have gone beyond what the Kalman filter is currently configured to track (i.e. the current level j). The increase is the reset or re-initialization operation to a "lower level" (say j−1) as mentioned above. No scheduling for this monitoring is required, and thus, a benefit is that there is no processor overhead. Instead, a dynamic, on-demand process occurs. The state error covariance P is modified when the actual residual errors are greater than tolerable system level designs, e.g., when a change modulation mode is desired. The multi-level lock detection optimizes the trade between steady-state error and the ability to "re-acquire." (FIG. 15) The diagonalization step is included when P is modified to eliminate limitations imposed by the memory of error correlations from previous "erroneous" operating points. The diagonalization step in a communication system context is more properly described as a "zeroing" of any system variables that should be uncorrelated, for example the timing errors between two independent users. This also promotes the accelerated recovery in multi-user systems.

Figure 11:
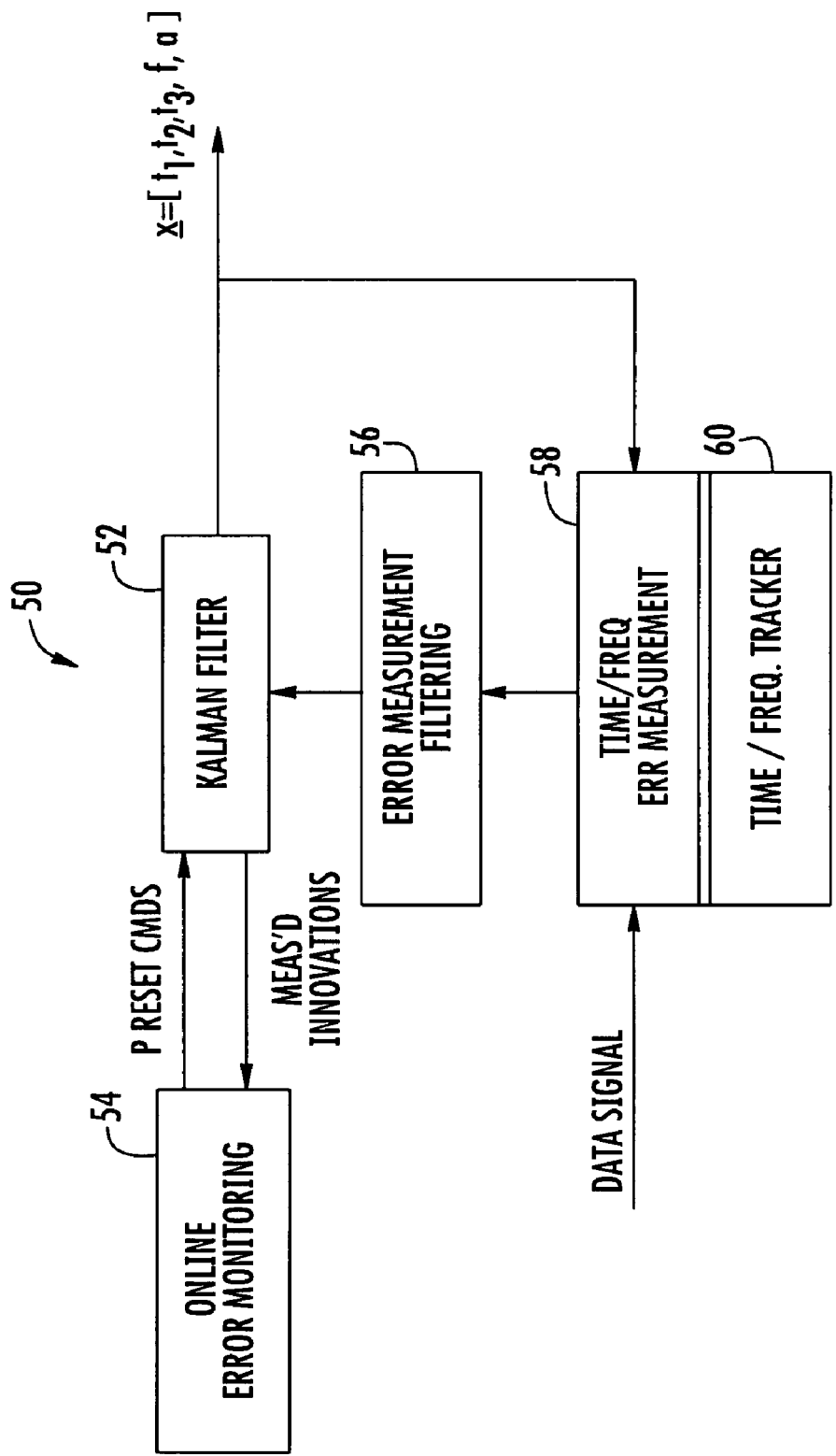
FIG. 11 is a block diagram showing a communications device having a Kalman filter system in accordance with a non-limiting example of the present invention and illustrating an on-line error monitoring circuit, a Kalman filter, an error measurement filtering circuit and time/frequency error measurement circuit.

FIG. 11 is a block diagram more specific to the actual implementation showing the basic components of the communication system employing the Kalman filter. The Kalman filter system 50, in accordance with a non-limiting example of the present invention, and showing the Kalman filter 52 and an on-line error monitoring circuit 54 and an error measurement filtering circuit 56 and time/frequency error measurement circuit 58, in accordance with a non-limiting example of the present invention. The time/frequency tracker 60 of the type as explained in the incorporated by reference application inputs into the time/frequency error measurement circuit.

The residuals are extended from the time/frequency error measurement circuit 58 into the error measurement filtering circuit. The residuals are also called innovations in some non-limiting examples. The residuals could be a white noise sequence and totally random with no information content. The system passes the residuals through the on-line error monitoring circuit, which has an application dependent maximum limit for each of various track states allowable in an application. The essential data is that each track state has its own limit residual value with the maximum and minimum limit as a threshold for a level and that the state error to initially enter/support a track state be known. Once the threshold is crossed and a reset command occurs, whatever track state the system is in, it backs up one state to a lower state (if the error it too large), or transitions to a better track state if the error is smaller than the minimum. The on-line error measuring circuit is operative as a threshold comparator. The track state transition is always exactly one level up or down per time index. Note that improved track state transitions do not re-initialize the state error covariance matrix P. It is only when the state must be degraded (e.g. presumably to an error or anomaly) that the P matrix is re-initialized.

It is desirable to measure the residuals on-line. The incorporated by reference '868 patent application provides the time/frequency error measurement system that can be incorporated for use with the present invention. The information obtained from the time/frequency recovery as explained in the incorporated by reference '868 patent application is exploited to make sure the performance of the Kalman filter stays constant and is handled in short-term perturbations for long-term performance. This can be accomplished by the time/frequency tracker (TFT) 60 that inputs to the time/frequency error measurement circuit.

It should be understood that there are a number of advantages for this system in accordance with non-limiting examples of the present invention. There are also a number of different possible uses for the system in accordance with non-limiting examples of the present invention.

These uses include MODEM/SDR Functional Elements as demodulation of m-ary PSK, equalizers, TWTA pre-distorters, timing recovery/frequency recovery, and constellation corrections. Health-care uses include fault detection or irregularity detection. Dynamic network performance optimization uses include network load forecasting, reservation-type protocols. Optical information processing is possible. Remote sensing applications include tracking/location systems for position/LOB estimation, SONAR processing, for example, target parameter estimation (e.g. location, size, etc.). Other uses include AMTI/GMTI RADAR processing, for example, target parameter estimation (e.g. location, size, etc.), including clutter suppression and geo-physical exploration.

FIG. 15 is a block diagram of a receiver terminal, including a front-end demodulator and Kalman filter-based time/frequency tracker (TFT) such as disclosed in the incorporated by reference '868 patent application that can be incorporated for use with the present invention.

As will be described below with reference to the architecture diagram of the TFT module shown in FIG. 15, account is made for this frequency error. A brief explanation follows. It should be understood that further details are set forth in the incorporated by reference application. The system includes a frequency error detector subsystem, that outputs frequency error data to a frequency error 'fusion' operator. The fusion operator is operative to combine individually and temporally local (i.e., with 1.5 ms) frequency error measurements into a single, more accurate, frequency error measurement. This fusion operator performs maximum likelihood (ML)-based fusion of frequency error data that relates to the same types of measurements (e.g., common range delay, Doppler), under the assumption of Gaussian errors. ML-fusion of frequency errors for different the different signals say notated as L, M, and X operative on a single communication platform provides the benefit of typically reducing the time to achieve the ultimately steady state tracking errors for each signal. The fused frequency error data is supplied as a frequency error input to the TFT module's Kalman filter operator. As in the case of detected timing error inputs, the Kalman filter operator is operative to drive detected frequency errors to zero, so that the receiver terminal will effectively track the frequency and time offsets of the any communication signal as it received under the influence of motion. Also depending on the assumed Kalman structure (i.e. scalar versus vector), one signal may be allowed to influence the others using a state vector approach where the L, M and X signals share say a common frequency offset but differing time offsets.

FIG. 15 shows an architecture of a satellite receiver terminal as a non-limiting example and includes a front-end demodulator and the Kalman filter-based time/frequency tracker (TFT) module. An embodiment of the TFT module uses receiver terminal-associated kinematic data measurements. Two elements of the kinematic measurement, namely range and velocity, are derived from the timing and frequency errors measured on selected synchronization resources of various signal types like L, M and X data signals. The times of transmission and frequencies of which may be a-periodically, or pseudo randomly, varied or hopped within one or more (typically, multiple) signals transmitted from the satellite. In particular, these timing and frequency error measurements (suitably converted) and the acceleration measurements are combined into kinematic data vectors, on 1.5 ms boundaries, and are used as data to update the Kalman filter kinematic state vector, which then outputs the updated kinematic state (a/k/a time/frequency) estimates to a kinematic state estimate processor. This processor uses the Kalman filter output data to adjust the receiver terminal's internal clock (the sampling clock for the terminal processor's associated analog-to-digital converter within the demodulator), thereby allowing demodulation and recovery of data with improved accuracy.

More particularly, as shown in FIG. 15, the composite TH/FH data signal may be from a satellite downlink-monitoring antenna, associated low noise amplifier and downconverter subsystem, such as may correspond to the antenna and associated receiver of a receiver terminal as is common in receiving systems, such as a shipboard-mounted terminal. That assembly is coupled to a demodulator 301 of a suitable front end system capable of receiving RF energy (e.g., and antenna with possible RF down-conversion). The programmable demodulator 301 is supplied with nominal knowledge (i.e., TRANSEC) of the time and frequency pulse patterns for the signals. As described previously, having knowledge of the frequency hopping plan allows the downlink receiver terminal to know when to look for one or more "synchronization" pulses, within pseudo randomly selected times slots of a frame of data of the monitored downlink signal, where a respective synchronization pulse pattern is associated with a respective user of the satellite, and selected in order to avoid the possibility of mutual interference.

As noted previously, in addition to relying upon timing and frequency errors, derived from synchronization pulses, that are pseudo randomly distributed among the times slots of the sub-frames making up the successive frames of data from the satellite, the Kalman filter of the time/frequency tracker (TFT) module may rely upon kinematic data, such as that sourced from an accelerometer subsystem aligned with the boresite of the receiver terminal's antenna. Acceleration data provides enhanced performance. For this purpose, as in the case of the mobile terminals (e.g., a surface ship-mounted receiver terminal of a satellite downlink communication system), the receiver terminals associated antenna-positioning subsystem may effectively continuously maintain the boresite of the antenna "pointed" at the satellite. As described above, this means that a range measurement is, in reality, a "pseudo" range measurement, which is more useful than a straight line measurement, since it measures the length of the true path over which the electromagnetic wave from the satellite actually travels, so that timing and frequency errors derived from the synchronization pulses are more accurate.

Referring again to FIG. 15, the front-end demodulator subsystem 301 is coupled to receive time and frequency adjustment commands from a kinematic state estimate processor 302. The demodulator 301 adjusts or refines the tuning of all sampling epochs and oscillators in the receiver terminal and uses these commands. The kinematic state estimate processor 302 receives kinematic state estimates, as generated by a Kalman filter operator or algorithm 303. Kalman filter operator 303 has an architecture and coefficient update methodology that uses time and frequency errors derived from received time- and frequency-hopped synchronization pulses, in combination with accelerometer-sourced kinematic updates (if available), representative of motion inputs to the receiver terminal, and which produce perturbations in the times of arrival and frequencies of the hopped sync pulses, to produce time and frequency correction values. These time and frequency correction values are employed by the kinematic state estimate processor 302 to generate the time and frequency adjustment commands to the demodulator 301 for refining the frequency and times of transitions in its sampling clock. The invention of adjustment of state error covariance is operative within the Kalman structure 302 and 303 to maintain the communication system operative to track the time and frequency offsets to maintain the data link with some degree of quality (e.g. limited versus full data rate). The degree of link capacity (i.e. state maintenance) is addressed in block 304 and is based on the residuals and errors as described in the corresponding application.

Configuration and operational characteristics of the Kalman filter operator 303 are established by configuration commands and parameters supplied by a control processor (track state manager/supervisor) 304, so as to enable the Kalman filter to operate with a selected one of a plurality of satellite-receiver terminal combinations (e.g., a total of eight combinations that may be realized from two satellite types and four earth terminal types), as will be described. The track state manager 304 is also coupled to receive kinematic state estimates produced by Kalman filter operator 303. The track state manager 304 monitors these estimates to track whether the performance of the Kalman filter operator 303 is acceptable. If the monitored estimates produced by the Kalman filter operator 303 indicate a performance level (kinematic state estimate error) that has departed from a prescribed application dependent tolerance, the track state manager processor 304 provides configuration adjustment commands (i.e., controls the state error covariance matrix, so as to increase the Kalman gain), as necessary, to bring the performance of the Kalman filter operator 303 back with acceptable levels. In particular, if the tracking errors start getting too large, the track state manager processor 304 will generate commands that effectively reduce the track state to a lower grade of tracking to essentially open up "capture bandwidth", by using larger Kalman gain on the time and frequency error measurements, so that the system may recapture sync. This is accomplished by adapting the state error covariance matrix P as described above. This operation places more emphasis on current measurements and corresponding less on the extrapolations, which use past data only. Such a controlled adjustment in the tracking state cannot be practically carried out in any PLL-based system which is typical of tracking time and frequency for a communication system.

Demodulator 301 outputs data representative of the sampling of detected time- and frequency-hopped synchronization pulses to a timing and frequency error detection subsystem 305. The time and frequency error detection subsystem scales the errors to form kinematic measurements of range and velocity error. Range errors are scaled time errors, where the conversion is given by $R_{err}=c\tau_{err}$ where the constant c is the speed of light. The velocity errors are scaled frequency errors, where the conversion is given by $$\frac{cf_{err}}{f_o},$$

where $f_o$ is the nominal (i.e., rest frame) frequency hop transmitted. As is the case with Kalman filter operator 303, configuration commands and operational parameters for the timing and frequency error detection subsystem 305, as well as those for a frequency error fusion operator 306, are provided by the track state manager/supervisor 304.

As pointed out previously, and as shown diagrammatically in FIG. 15, the timing and frequency error detection subsystem 305 contains a plurality N of timing error detectors: Timing 1, ..., Timing N; and a plurality N of frequency error detectors: Frequency 1, ..., Frequency N. As described above, a respective timing error detector, Timing i, is associated with a particular data rate synchronization pulse and may be implemented as detailed in Aldo N. D'Andrea, Umberto Mengali, Michele Morelli, "*Symbol Timing Estimation with CPM Modulation*," IEEE Transactions on Communications, vol. 44, no. 10, October 1996, pp. 1362-1372, and M. Morelli, A. N. D'Andrea, U. Mengali, "*Feedforward ML-based Timing Estimation with PSK signals*," IEEE Communications Letters, vol. 1, no. 3, May 1997, pp. 80-82. As such, a respective timing error detector Timing i is operative to conduct timing error measurements on a specified ith one of N synchronization pulses, with the value $\tau_{ERRi}$ of a timing error measurement for that sync pulse being coupled to the Kalman filter operator 303. Similarly, a respective frequency error detector, Frequency i, of the timing and frequency error detection subsystem 305, which may be implemented as detailed in Umberto Mengali, M. Morelli, "*Data-Aided Frequency Estimation for Burst Digital Transmission*", IEEE Transactions on Communications, vol. 45, no. 1, January 1997, pp. 23-25, and is operative to conduct frequency error measurements on a given ith one of N sync pulse, with the value $f_{ERRi}$ the frequency error measurement being coupled to the frequency error fusion operator 306.

As noted earlier, frequency error fusion operator 306 performs maximum likelihood (ML)-based fusion of frequency (velocity) measurement data, in order to exploit the availability, from multiple sensors (frequency error detectors 1-N), of information that represents the same types of measurements (e.g., common Doppler), Maximum-likelihood fusion of frequency/velocity measurements for hopped sync pulses of respectively different and independent signals (such as L, M and X of the present example) serves to improve the time to reach an ultimate track state for all signals, and it is a beneficial method to avoid complexities associated with scheduling and ordering the processing nearly simultaneous independent measurements of a common parameter. The frequency error processing is basically a two-step process. First, the individual frequency errors for L, M and X are aggregated over the number of pulses necessary (e.g., eight or sixteen, as described above), to generate sufficiently accurate measurements. Then, at a suitable time boundary, the measurements are to be applied in the Kalman filter, the fusion between all available frequency errors is applied, and a single value is supplied to the Kalman filter. The frequency is thus tracked as a single common Kalman state for all data signals. However, because time offsets are not typically common amongst all data sources this data type is not fused and all time offsets are tracked as separate Kalman states.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
   a time/frequency error measurement circuit that receives a communications signal and measures its timing and frequency errors within the communications signal;
   a Kalman filter that receives the communications signal from the time/frequency error measurement circuit and processes the communications signal using a multi-level state error covariance matrix P for controlling any Kalman gain in the Kalman filter; and
   an online error monitoring circuit operative with the Kalman filter and configured to monitor any actual state errors in time and frequency and control the multi-level state error covariance matrix P based on a measured error threshold, wherein levels within the multi-level state error covariance P are defined initially as true initial errors.

2. The communications device according to claim 1, wherein the state error covariance matrix P is reset from a theoretical P to an actual P to open up bandwidth to an actual state error covariance matrix P when one of at least excessive time and frequency errors occur.

3. The communications device according to claim 1, wherein said multi-level state error covariance matrix P comprises a value determined from a look-up table comprising a plurality of downlink tracking states having different synchronization pulse types.

4. The communications device according to claim 3, wherein said online error measuring circuit is operative for receiving and passing residuals at a maximum limit for each of a plurality of track states.

5. The communications device according to claim 3, wherein said look-up table comprises a plurality of steady state time tracking errors and steady state frequency tracking errors.

6. The communications device according to claim 5, wherein said multi-level state error covariance matrix P comprises a steady state time or frequency tracking error value determined from said look-up table.

7. The communications device according to claim 1, wherein said Kalman filter is operative for producing minimum mean square error (MMSE) estimates of timing and frequency errors.

8. The communications device according to claim 1, and further comprising a time/frequency tracker operative to acquire and track time and frequency variations in synchronization signals conveyed over communications links.

9. The communications device according to claim 8, and further comprising a receiver clock, wherein said time/frequency tracker is operative to synchronize the receiver clock with a clock signal embedded within the communications signal.

10. The communications device according to claim 9, and further comprising a front-end demodulator in which said receiver clock is incorporated.

11. A communications system, comprising:
    a plurality of signal sources that transmit communications signals operating at respectively different data rates over respective ones of a plurality of communications links;
    a receiver that receives the plurality of communications signals, and comprising a
       a front end demodulator having a receiver clock that is used in the recovery of data from communications signals received from the signal sources;
       a time/frequency error measurement circuit that receives the communications signal and measures any timing and frequency errors with the communications signals;
       a Kalman filter that receives communications signals from the time/frequency error measurement circuit and processes the communications signals using a multi-level state error covariance matrix P for controlling any Kalman gain within the Kalman filter;
       an online error monitoring circuit operative with the Kalman filter configured to monitor actual state errors in time and frequency and control state error covariance matrix P based on a measured error threshold; and
       a time/frequency tracker operative to acquire and track time and frequency variations in synchronization signals conveyed over the communications links and operative to synchronize the receiver clock with a clock signal embedded within the communications signal, wherein levels within the multi-level state error covariance P are defined initially as true initial errors.

12. The communications system according to claim 11, wherein the state error covariance matrix P is reset from a theoretical P to an actual P to open up bandwidth to an actual state error covariance matrix P when one of at least excessive time and frequency errors occur.

13. The communications system according to claim 11, wherein said multi-level state error covariance matrix P comprises a value determined from a look-up table comprising a plurality of downlink tracking states having different synchronization pulse types.

14. The communications system according to claim 13, wherein said online error measuring circuit is operative for receiving and passing residuals at a maximum limit for each of a plurality of track states.

15. The communications system according to claim 13, wherein said look-up table comprises a plurality of steady state time tracking errors and steady state frequency tracking errors.

16. The communications system according to claim 11, wherein said Kalman filter is operative for producing minimum mean square error (MMSE) estimates of timing and frequency errors.

17. A method of communicating, comprising:
    receiving a communications signal and measuring any timing and frequency errors within a time/frequency error measurement circuit;

processing data from the time/frequency error measurement circuit using a multi-level state error covariance matrix P for controlling any Kalman gain in a Kalman filter;

monitoring actual state errors in time and frequency and controlling the multi-level state error covariance matrix P based on a measured error threshold; and resetting the state error covariance matrix P from a theoretical P to an actual to open up bandwidth to an actual state error covariance matrix P when one of at least excessive time and frequency errors occur.

18. The method according to claim 17, which further comprises receiving and passing residuals at a maximum limit for each of a plurality of track states.

19. The method according to claim 17, which further comprises generating a multi-level state error covariance matrix P from a value determined from a look-up table comprising a plurality of downlink tracking states having different synchronization pulse types.

\* \* \* \* \*